(12) United States Patent
Wokhlu et al.

(10) Patent No.: US 10,884,756 B2
(45) Date of Patent: Jan. 5, 2021

(54) SYSTEM AND METHOD FOR VARIABLE LANE ARCHITECTURE

(71) Applicant: Futurewei Technologies, Inc., Plano, TX (US)

(72) Inventors: Sushma Wokhlu, Frisco, TX (US); Alan Gatherer, Richardson, TX (US); Ashish Rai Shrivastava, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/876,995

(22) Filed: May 18, 2020

(65) Prior Publication Data

US 2020/0278869 A1 Sep. 3, 2020

Related U.S. Application Data

(63) Continuation of application No. 15/220,067, filed on Jul. 26, 2016, now Pat. No. 10,691,463.

(Continued)

(51) Int. Cl.
*G06F 9/30* (2018.01)
*G06F 9/38* (2018.01)
*G06F 9/48* (2006.01)

(52) U.S. Cl.
CPC .......... *G06F 9/3869* (2013.01); *G06F 9/3004* (2013.01); *G06F 9/30036* (2013.01);
(Continued)

(58) Field of Classification Search
CPC .. G06F 9/30036; G06F 9/3836; G06F 9/3869; G06F 9/3885; G06F 15/80; G06F 15/8053; G06F 15/8092
See application file for complete search history.

(56) References Cited

U.S. PATENT DOCUMENTS 5,588,152 A 12/1996 Dapp et al.
6,026,478 A 2/2000 Dowling
(Continued)

FOREIGN PATENT DOCUMENTS

| CN | 1349159 A | 5/2002 |
|---|---|---|
| CN | 1172240 C | 10/2004 |
| CN | 101443740 A | 5/2009 |
| CN | 102156637 A | 8/2011 |
| CN | 102695249 A | 9/2012 |
| CN | 103207773 A | 7/2013 |

(Continued)

OTHER PUBLICATIONS

Kozyrakis, et al., "Scalable Processors in the Billion Transistor Era: IRAM," Computer, IEEE Sep. 1997, pp. 75-78.
(Continued)

*Primary Examiner* — Benjamin P Geib
(74) *Attorney, Agent, or Firm* — Slater Matsil, LLP

(57) ABSTRACT

A system and method for variable lane architecture includes memory blocks located in a memory bank, one or more computing nodes forming a vector instruction pipeline for executing a task, each of the computing nodes located in the memory bank, each of the computing nodes executing a portion of the task independently of other ones of the computing nodes, and a global program controller unit (GPCU) forming a scalar instruction pipeline for executing the task, the GPCU configured to schedule instructions for the task at one or more of the computing nodes, the GPCU further configured to dispatch an address for the memory blocks used by each of the computing nodes to the computing nodes.

22 Claims, 9 Drawing Sheets

Related U.S. Application Data

(60) Provisional application No. 62/198,886, filed on Jul. 30, 2015.

(52) U.S. Cl.
CPC .......... *G06F 9/3836* (2013.01); *G06F 9/3851* (2013.01); *G06F 9/3877* (2013.01); *G06F 9/3885* (2013.01); *G06F 9/3887* (2013.01); *G06F 9/3897* (2013.01); *G06F 9/4881* (2013.01)

(56) References Cited

U.S. PATENT DOCUMENTS

| | | | |
|---|---|---|---|
| 8,180,998 | B1 | 5/2012 | Maher et al. |
| 2003/0018868 | A1 | 1/2003 | Chung |
| 2003/0074542 | A1 | 4/2003 | Sasagawa |
| 2004/0216119 | A1 | 10/2004 | Beaumont |
| 2006/0206641 | A1 | 9/2006 | Klein |
| 2007/0038842 | A1 | 2/2007 | Kirsch |
| 2007/0271416 | A1 | 11/2007 | Ahmed |
| 2010/0095152 | A1 | 4/2010 | Darrington et al. |
| 2010/0118852 | A1 | 5/2010 | Codrescu et al. |
| 2010/0299541 | A1 | 11/2010 | Ishikawa et al. |

FOREIGN PATENT DOCUMENTS

| | | |
|---|---|---|
| CN | 104199801 A | 12/2014 |
| CN | 104778080 A | 7/2015 |
| JP | H0635875 A | 2/1994 |
| JP | H11306037 A | 11/1999 |
| JP | H11306149 A | 11/1999 |
| JP | 2003091415 A | 3/2003 |
| JP | 2010271930 A | 12/2010 |
| JP | 2013054625 A | 3/2013 |
| WO | 2015019197 A2 | 2/2015 |

OTHER PUBLICATIONS

Krashinsky, et al., "Implementing the Scale Vector-Thread Processor," 2008, ACM Transactions on Design Automation of Electronic Systems, vol. 13, No. 3, Article 41, Jul. 2008, 24 pages.

Krashinsky et al., "The Vector-Thread Architecture," Proceedings of the 31st Annual International Symposium on Computer Architecture (ISCA '04), IEEE 2004, 12 pages.

Lee, et al., "Exploring the Design Space of SPMD Divergence Management on Data-Parallel Architectures," 47th International Symposium on Microarchitecture (MICRO-47), Cambridge, UK, Dec. 2014, 13 pages.

Lee, et al., "Hwacha Preliminary Evaluation Results, Version 3.8.1," Technical Report, UCB/EECS-2015-264, EECS Department, University of California, Berkeley, Dec. 19, 2015, 21 pages.

Lee, et al., "The Hwacha Vector-Fetch Architecture Manual, Version 3.8.1," Technical Report, UCB/EECS-2015-262, EECS Department, University of California, Berkeley, Dec. 19, 2015, 46 pages.

Lee, et al. "The Hwacha Microarchitecture Manual, Version 3.8.1," Technical Report, UCB/EECS-2015-263, EECS Department, University of California, Berkeley, Dec. 19, 2015, 23 pages.

Lee, et al., "A 45nm 1.3GHz 16.7 Double-Precision GFLOPS/W RISC-V Processor with Vector Accelerators," 40th European Solid-State Circuits Conference (ESSCIRC-40), Venice, Italy, Sep. 2014, 4 pages.

Lee, et al., "Hwacha: What GPUs Can Learn From Vectors," 2014 NVIDIA GPU Technology Conference (GTC-2014), San Jose, CA, Mar. 2014, 1 page.

Lee, et al., "Measuring the Gap between Programmable and Fixed-Function Accelerators: A Case Study on Speech Recognition," Poster at the 25th Symposium on High Performance Chips (HotChips-25), Stanford, CA, Aug. 2013, 2 pages.

Lee, et al., "Convergence and Scalarization for Data-Parallel Architectures," 2013 International Symposium on Code Generation and Optimization (CGO-2013), Shenzhen, China, Feb. 23-27, 2013, 11 pages.

"The Hwacha Project; Hwacha Overview," http://hwacha.org/, downloaded Dec. 15, 2016, 4 pages.

Ou, et al., "A Case for MVPs: Mixed-Precision Vector Processors," 2nd International Workshop on Parallelism in Mobile Platforms (PRISM-2), at the 41st International Symposium on Computer Architecture (ISCA-41), Minneapolis, MN, Jun. 2014, 7 pages.

Sheffield, et al., "Hardware/Software Codesign for Mobile Speech Recognition," 14th Conference of the International Speech Communication Association (INTERSPEECH-14), Lyon, France, Aug. 2013, 5 pages.

Anonymous, "Very Long Instruction Word" Wikipedia, May 27, 2015, CP055582052, https://en.wikipedia.org/w/index.php?title=Very_long_instructions_word&0Idid=66214665, 7 pages.

SYSTEM AND METHOD FOR VARIABLE LANE ARCHITECTURE

CROSS-REFERENCE TO RELATED APPLICATIONS

This application is a continuation of U.S. patent application Ser. No. 15/220,067, filed on Jul. 26, 2016 which claims priority to U.S. Provisional Application No. 62/198,886, filed on Jul. 30, 2015, which applications are hereby incorporated by reference.

TECHNICAL FIELD

The present invention relates generally to computer architectures, and, in particular embodiments, to a system and method for variable lane architecture.

BACKGROUND

Generally, real-time systems such as wireless baseband (BB) systems are data-flow systems. In data-flow systems, sequential data symbols, such as symbols in a radio frame, are usually different, and are typically moved from a shared memory location to a specific memory location for deterministic computations. Shared memory is typically located far from where such computations are performed, and specific memory is typically located near where such computations are performed.

In a wireless BB system, multiple users are supported with different radio resource allocations. These different allocations can be computed as a group, with some restrictions, in a single instruction, multiple data (SIMD) system. SIMD computations require a large amount of data movement, manipulation, and reorganization to support SIMD instructions, which increases power consumption, and requires extra memory to hold redundant copies of data in multiple places. Scheduling tasks in a large SIMD processor may be more complex. Further, algorithms must be created and compiled to utilize SIMD efficiently. As a result, although large SIMD processors can theoretically increase performance of data-flow systems, it is impractical and difficult to obtain these performance increases.

SUMMARY

In accordance with a preferred embodiment of the present invention, a processor includes memory blocks located in a memory bank; one or more computing nodes forming a vector instruction pipeline for executing a task, each of the computing nodes located in the memory bank, each of the computing nodes executing a portion of the task independently of other ones of the computing nodes; and a global program controller unit (GPCU) forming a scalar instruction pipeline for executing the task, the GPCU configured to schedule instructions for the task at one or more of the computing nodes, the GPCU further configured to dispatch an address for the memory blocks used by each of the computing nodes to the computing nodes.

In accordance with a preferred embodiment of the present invention, a method includes receiving program code for a task; assigning a plurality of computing nodes to perform the task; dispatching first fetch packets for the program code and first respective data pointers for the first fetch packets to each of the plurality of computing nodes; receiving a beat from each node of the plurality of computing nodes in response to each node completing execution of the first fetch packets dispatched to the node; and tracking execution of the program code by the plurality of computing nodes in accordance with the received beats.

In accordance with a preferred embodiment of the present invention, a program control unit includes a very long instruction word (VLIW) bundle dispatcher configured to decode program code for a first task; a data address generation and organization (DAGO) unit configured to assign data pointers for the program code; and a scheduler configured to be coupled to a plurality of computing nodes, the scheduler configured to allocate the plurality of computing nodes to execute the program code, the scheduler configured to allocate a first thread to a first subset of the plurality of computing nodes, and to allocate a second thread to a second subset of the plurality of computing nodes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

According to various embodiments, vector data may be stored in high-speed memory and near computing elements. Storing data near computing elements may allow for efficient and deterministic task execution on non-uniform memory access (NUMA) architectures. High-speed memory may include caches, private L1 (PL1) memory, and the like. Storing data in high-speed memory allows the data to be accessed very quickly, but may require the entire data set to be loaded prior to task execution. High-speed memory may be small, limiting the size of tasks that will fit in the high-speed memory, and stalling the execution of tasks when data in the high-speed memory is flushed out to higher capacity memory. Ping-pong scheduling schemes may improve the latency of loading data sets prior to execution, but such schemes have increased memory requirements, as they require data for the current job and the next job to be loaded in memory. Centralized shared memory schemes attempt to solve capacity issues, but may suffer from longer latencies. Larger caches may help solve capacity and latency problems, but adding an additional level of design may increase complexity and cause coherency issues.

Figure 1:
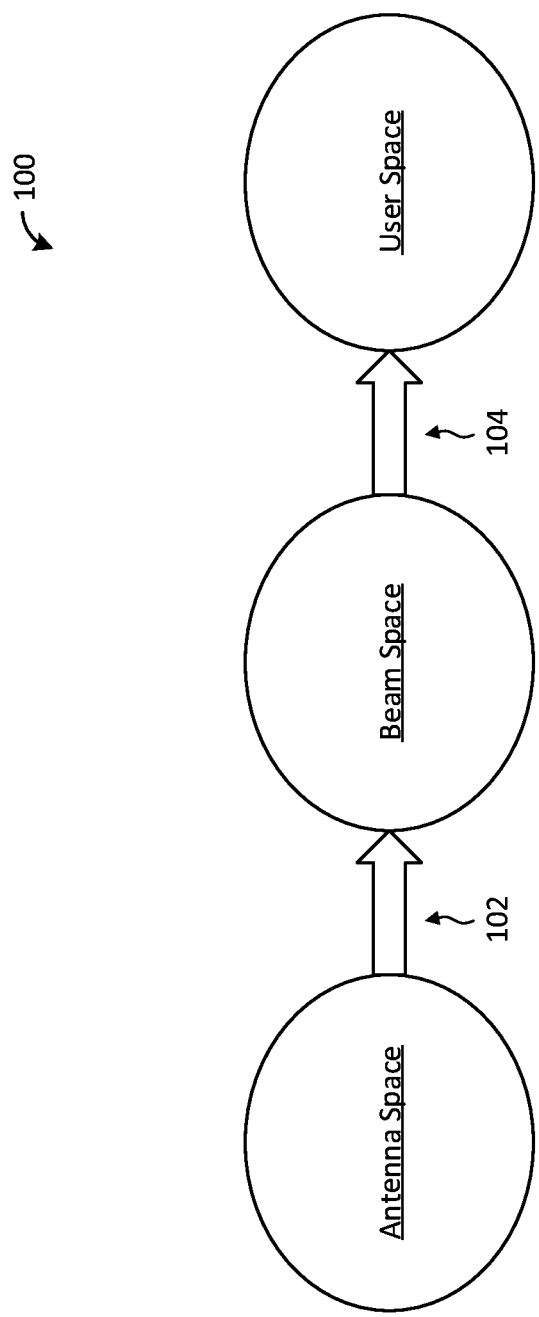
FIG. 1 is a diagram of a data-flow system.

FIG. 1 is a diagram of a data-flow system 100. The data-flow system 100 illustrates operations occurring during vector computations in a wireless baseband system. Each element in the vector may have the same computations performed on it when an instruction is executed. As such, a vector computation system may be referred to as including multiple lanes, where each lane executes instructions for an element of the vector. The data-flow system 100 includes an antenna space, a beam space, and a user space. Data flows through each space during a transmission. For example, vector data first flows through the antenna space, where an antenna is selected. The vector data then flows through the beam space, where a beam for the antenna is selected. The vector data then flows through the user space, where a broadcast code or sequence is selected. Different computations are performed in the antenna space, the beam space, and the user space. As such, the vector data in the data-flow system 100 must be manipulated and/or reorganized at points 102 and 104 of the data-flow system 100, e.g., between each space. The vector data is manipulated so that it can be prepared for algorithms in each subsequent space. For example, algorithms in each space may operate on data vectors of different sizes. Additionally, data may need to be pre-fetched at points 102 and 104. Although the present discussion is presented in the context of a wireless baseband system, it should be appreciated that the data-flow system 100 may be part of any system.

Embodiments provide a scalable, variable length multi-lane architecture based on dynamically programmable and distributed computing nodes. Embodiment multi-lane systems may be referred to as "relaxed instruction multiple data" (RIMD) systems. RIMD architectures may be more efficient than SIMD architectures. In some embodiments, RIMD computing nodes are co-located with system memory. In such embodiments, the RIMD computing nodes may directly access remote memory banks without first copying the data to nearby memory banks. Moving or copying data from remote memory banks to nearby memory banks may be a slow operation. Locating the computing nodes closer to memory may reduce the amount of data movement, increasing access speed. In some embodiments, instructions for a task or program are propagated from a global program controller unit (GPCU), through memory, and to the computing nodes.

Embodiments split the pipeline of a processor into a scalar processing portion and a vector processing portion. The vector processing portion is a RIMD pipeline. SIMD processors typically perform computations on a data vector in lock-step execution, where each element in the vector is processed before the SIMD pipeline continues.

Embodiments remove the need for lock-step execution, allowing a variable length multi-lane to include any number of computing nodes and thus process any length of data vector. Scalar processing portions of the processor configure the vector processing portion of the processor and dispatch programming to the vector processing portion.

Each computing node in the RIMD pipeline executes instructions independent of other computing nodes. In some embodiments, all lanes of an RIMD pipeline may or may not execute instructions simultaneously or in the same clock cycle. In such embodiments, the various lanes of an RIMD pipeline are shifted in the time domain. The shift can be as small as one clock cycle, and up to a maximum number of clock cycles as determined by the ability of the RIMD system to buffer instructions and/or data at the computing nodes.

Because the computing nodes execute independently and can be on different clock cycles, the computing nodes may stall independently of one another, reducing the overall performance impact of a single computing node stalling. Because the computing nodes execute instructions independently, memory can be accessed without moving data from remote memory to nearby memory. Although memory access operations to remote memory may be slower, the memory performance penalty may be less than the performance increase that is realized from eliminating the need to reorganize and cache data, and from eliminating the need to execute instructions in a lock-step manner. Because the computing nodes do not execute instructions in lock-step, each lane of the vector pipeline may adapt to the latency of the system memory. Accordingly, RIMD processors may have an overall performance increase compared to SIMD processors. Such processors may be referred to as split latency adaptive pipeline (SLAP) processors.

Figure 2:
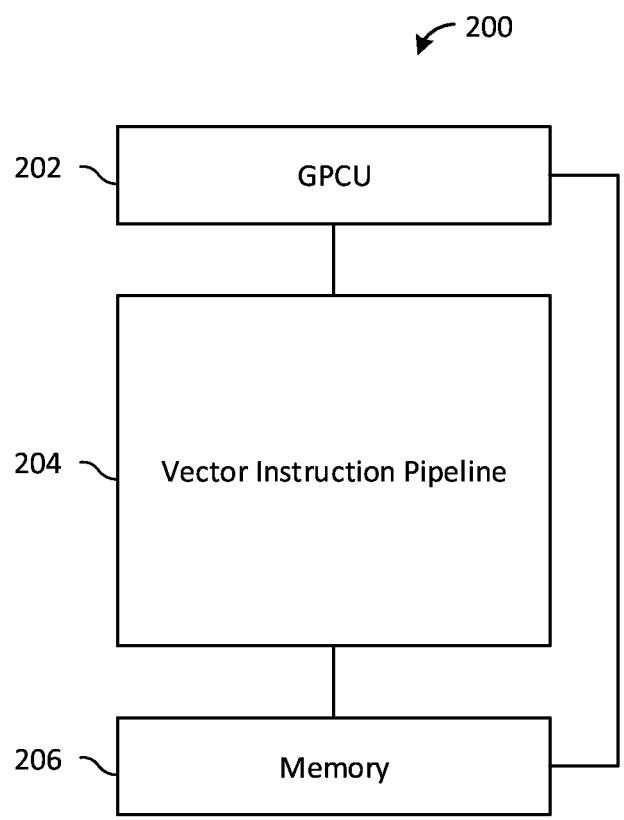
FIGS. 2-5 are block diagrams of a processing system.

FIG. 2 is a block diagram of a processing system 200. The processing system 200 performs multiple-data computations for one or more of the spaces in the data-flow system 100. The processing system 200 includes a GPCU 202, a vector instruction pipeline 204, and memory 206. The GPCU 202 is coupled to the vector instruction pipeline 204 and to the memory 206. The memory 206 may also be coupled to the vector instruction pipeline 204.

The GPCU 202 tracks and manages the execution of instructions in the processing system 200. Data processing may stall at one or more of the lanes in the processing system 200. The GPCU 202 tracks the stalls in each lane, and distributes instructions to each lane for processing based on the progress of each lane. Function units that form a scalar instruction pipeline are included with the GPCU 202, which may be used to perform control operations that create and maintain the vector instruction pipeline 204. Control operations may include changing program flow; input and output data address calculations and/or manipulations; operations that interact with local, centralized, or distributed operating systems; interrupt handling; memory allocations; and the like. Scalar control operations use and manipulate standard data types, such as C data types. In some embodiments, the GPCU 202 is a system running an operating system such as Linux.

The vector instruction pipeline 204 includes multiple lanes that each perform mathematical computations on vector data types. The vector instruction pipeline 204 is a RIMD pipeline with multiple computing nodes, where each computing node processes instructions independent of the other computing nodes. The computing nodes in the vector instruction pipeline 204 may not operate in a lock-step manner, and may each execute instructions in the same or different cycles. A task or thread may be constructed for execution with any quantity of RIMD computing nodes in the vector instruction pipeline 204. In particular, the GPCU 202 may dynamically group a variable quantity of RIMD computing nodes in the vector instruction pipeline 204 to form a pipeline that is similar to a SIMD machine. The formed pipeline may not have the drawbacks that SIMD has, such as requiring data to be re-organized so that it is compatible with SIMD.

The vector instruction pipeline 204 may be scalable, flexible, and efficient for different types of algorithms. The number of RIMD compute nodes allocated in the vector instruction pipeline 204 for a particular algorithm may be variable, and may be selected to optimize the quantity of lanes for that algorithm. Optimizing the quantity of RIMD computing nodes may increase power savings, as unneeded nodes may be powered down.

The memory 206 may be remote memory, or may be nearby memory such as a cache. The memory 206 is shared memory that includes multiple memory blocks. Each RIMD in the vector instruction pipeline 204 accesses the memory 206 independently. As such, data may not need to be reorganized, manipulated, or aligned for the vector instruction pipeline 204 to properly access the memory 206. The shared memory is distributed, and may not have a central location that each RIMD in the vector instruction pipeline 204 accesses. Although they are illustrated as separate blocks, it should be appreciated that the computing nodes of the vector instruction pipeline 204 are located in the memory 206. Memory banks or nodes in the memory 206 are shared by nearby computing nodes. Locating the computing nodes of the vector instruction pipeline 204 in the memory 206 may increase performance, reduce the cost of data movement, and reduce the quantity of memory access operations.

Figure 3:
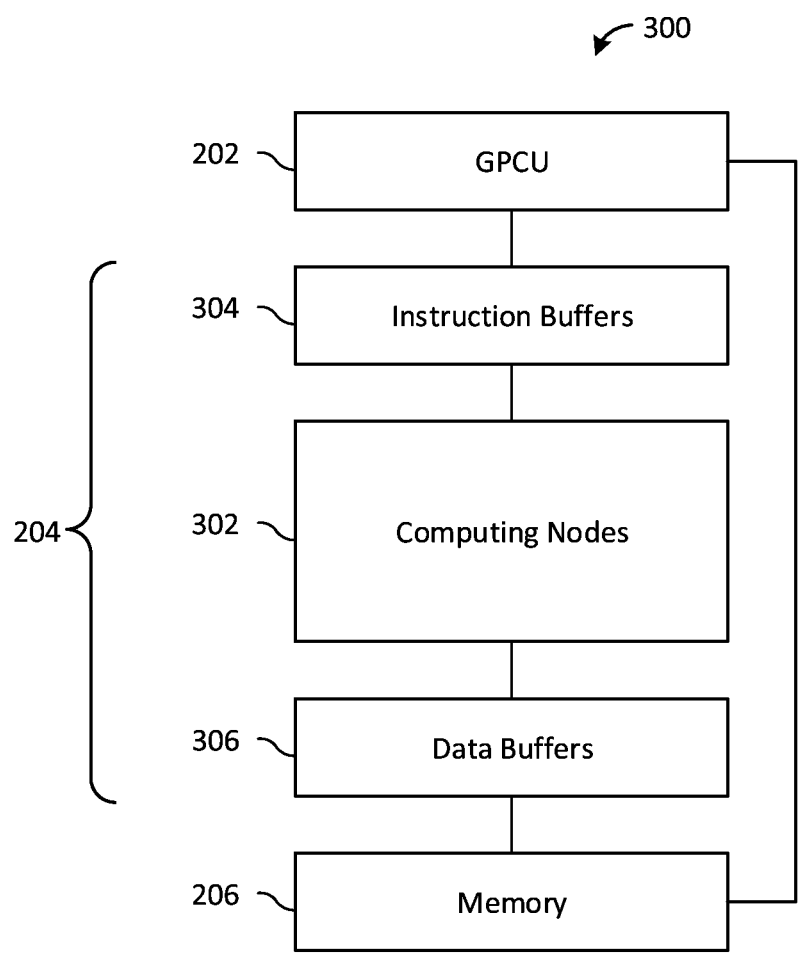

FIG. 3 is a block diagram of a processing system 300. The processing system 300 is similar to the processing system 200, except the vector instruction pipeline 204 includes computing nodes 302, an instruction buffer 304, and a data buffer 306. The GPCU 202 sends instructions for the computing nodes 302 to the instruction buffer 304. The instruction buffer 304 may be, e.g., a queue. The computing nodes 302 each fetch more instructions for execution from the instruction buffer 304 when those computing nodes complete execution of their current instructions. As such, the buffered instructions may be referred to as fetch packets. The data buffer 306 may be a queue, and buffers data that the computing nodes 302 store in the memory 206. Additionally, the data buffer 306 may buffer read data from the memory 206, and may re-order the data read from the memory 206. In some embodiments, the GPCU 202 dispatches read requests for data to the data buffer 306 so that the data arrives at the appropriate computing nodes 302 in the proper order.

The GPCU 202 may schedule the computing nodes 302 in several manners. In some embodiments, the GPCU 202 schedules the computing nodes 302 semi-randomly. In some embodiments, the GPCU 202 attempts to put a best effort into coordinating instructions at computing nodes 302 that are located near banks of the memory 206 that the instructions will access.

The vector instruction pipeline 204 also includes arbiters (not shown) that efficiently distribute instructions to the computing nodes 302. In some embodiments, the computing nodes 302 use direct memory access (DMA) to copy data from portions of the memory 206 near one of the computing nodes 302 to portions of the memory 206 near another computing node. Directly copying data may allow faster access to the memory by avoiding an intermediate copy operation. In such embodiments, DMA operations may be scheduled to computing nodes 302 that have less open DMA connections, balancing the quantity of DMA masters in the computing nodes 302.

Figure 4:
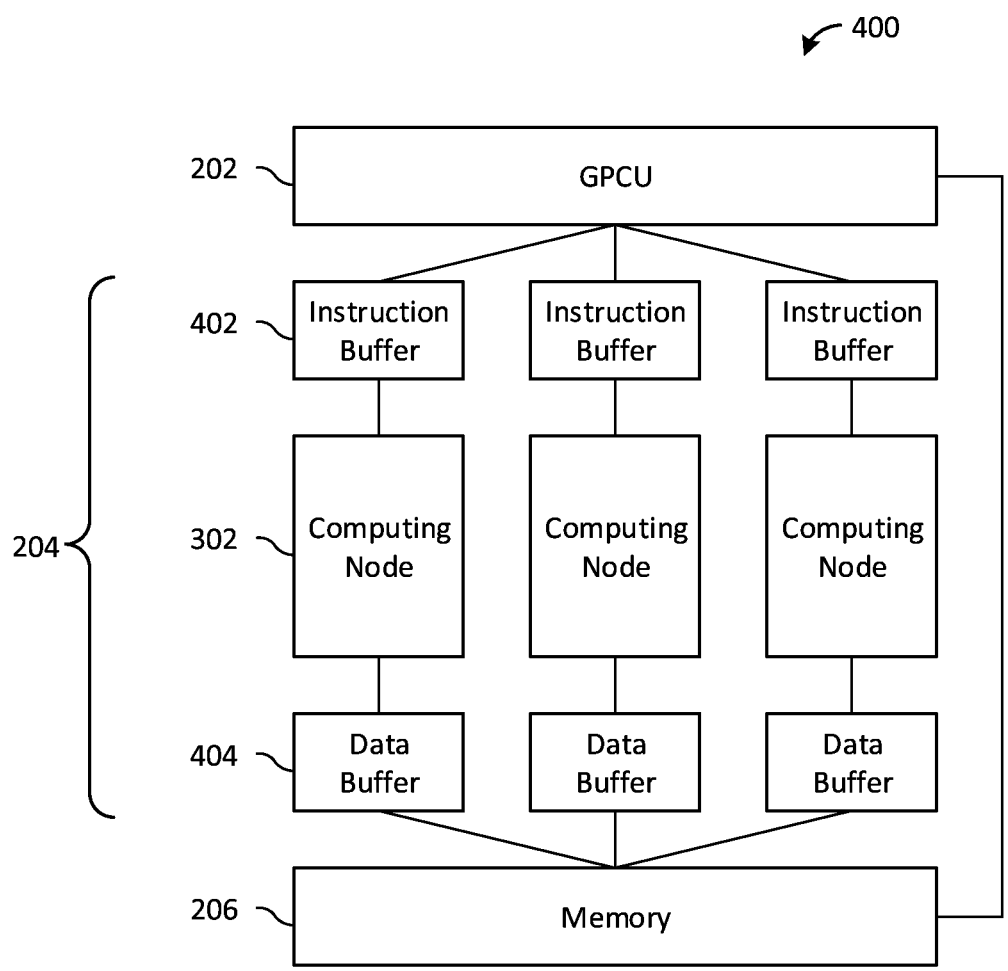

FIG. 4 is a block diagram of a processing system 400. The processing system 400 is similar to the processing system 300, except each of the computing nodes 302 have their own instruction buffer 402 and data buffer 404. By including an instruction buffer 402 with each of the computing nodes 302, the computing nodes 302 are further isolated from one another and the GPCU 202. As such, stalls in one of the lanes of the vector instruction pipeline 204 may not cause stalls in the other lanes.

Each instruction buffer 402 includes a beat mechanism to help the GPCU 202 keep track of program execution. The instruction buffer 402 sends a beat to the GPCU 202 each time a computing node 302 finishes executing an instruction in the instruction buffer 402. A beat may be, e.g., a 1-bit event notification. In some embodiments, the GPCU 202 tracks stalls in each of the computing nodes 302 by counting the beats sent from the instruction buffers 402. The GPCU may slow or halt scheduling of instructions to the instruction buffers 402 when the quantity of counted beats exceeds a threshold, e.g., when the computing nodes 302 are too far behind. In some embodiments, the instruction buffers 402 may each buffer a full fetch packet.

As noted above, the computing nodes 302 execute instructions independent of one another, and so may stall independently of one another. Independent stalling may reduce the overall effect of stalls in the processing system 400. Although the computing nodes 302 execute the same program, the computing nodes 302 may be halted or clocked independently, have their memory access reduced, and access unique patterns of data different from other computing nodes 302. Such independent execution and stalling may reduce power consumption in RIMD systems and allow multiple ones of the computing nodes 302 to access data in a same memory bank on a single instruction. In some embodiments, when multiple ones of the computing nodes 302 attempt to simultaneously access a same memory location, the GPCU 202 may access common data in the memory and then broadcast the data to all requesting nodes using the instruction buffers 402. In such embodiments, the data may be a field in instructions in the instruction buffers 402.

In some embodiments, the GPCU 202 may use the beats from each of the instruction buffers 402 to form a barrier amongst a subset of the computing nodes 302. The barrier may be used to synchronize the computing nodes 302 with the GPCU 202. The GPCU 202 forms a barrier in the instruction flow by not sending further instructions until all of the computing nodes 302 have synchronized to a common (barrier) instruction. The GPCU 202 counts the beats (discussed above) from each of the computing nodes 302 to determine when each node has synchronized to the common instruction. Once each of the computing nodes 302 have reached the barrier, the GPCU 202 resumes sending instructions and allows the computing nodes 302 to flow asynchronously again. Synchronizing the computing nodes 302 decreases the risk of the nodes accessing stale data that was previously produced by the other nodes. As such, in embodiments where a barrier is formed, memory access operations from the computing nodes are synchronized so that they are performed in the proper order.

Figure 5:
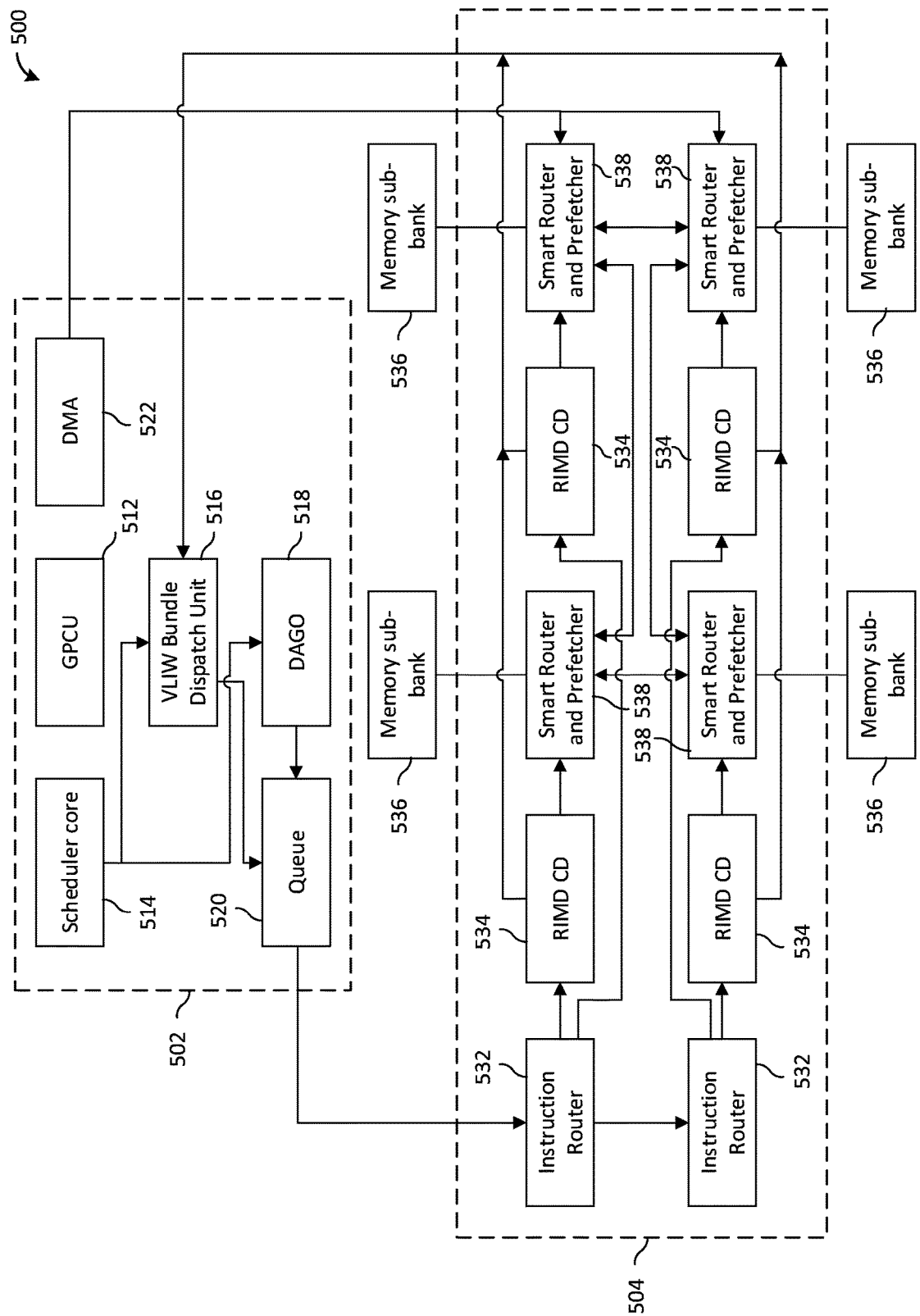

FIG. 5 is a block diagram of a processing system 500. The processing system 500 includes a control unit 502 and a vector instruction pipeline 504. The control unit 502 manages and dispatches instructions to the vector instruction pipeline 504. The vector instruction pipeline 504 is located with memory, such that computing nodes in the vector instruction pipeline 504 are distributed among memory sub-banks.

The control unit 502 includes a GPCU 512, a scheduler core 514, a partially decoded very long instruction word (VLIW) bundle dispatch unit 516, a data address generation and organization (DAGO) unit 518, a VLIW bundle and data address queue 520, and a DMA controller 522.

The GPCU 512 controls instruction decoding and dispatching. The scheduler core 514 schedules the RIMD computing nodes 534 (discussed below) for a particular job or task. The partially decoded VLIW bundle dispatch unit 516 extracts instructions from a VLIW instruction bundle and sends them to the VLIW bundle and data address queue 520. The DAGO 518 generates and assigns memory addresses (or "data pointers") to the computing units, and sends them to the VLIW bundle and data address queue 520. The DAGO 518 may also perform any needed memory operation reorganization. A program for execution may be split into global and local controllers. There may be some overlap between some stages to relax the complexity and provide best performance.

The vector instruction pipeline 504 includes instruction routers 532, RIMD computing nodes 534, memory sub-banks 536, and smart router and prefetcher units 538. The instruction routers 532 receive instructions from the VLIW bundle and data address queue 520 and distribute them to the RIMD computing nodes 534. There may be one or more of the instruction routers 532.

Each of the RIMD computing nodes 534 executes the instructions independently of one another. Clock gating for each of the RIMD computing node 534 may be flexible, such that each node has its own input clock connection that is gated for the node when the node is not used. The RIMD computing nodes 534 are coupled to the partially decoded VLIW bundle dispatch unit 516. Each time the RIMD computing nodes 534 finish executing instructions, they notify the partially decoded VLIW bundle dispatch unit 516. In some embodiments, the notification is a 1-bit beat. The GPCU 512 counts the number of beats and dispatches more instructions to the vector instruction pipeline 504 according to the quantity of received beats. The RIMD computing nodes 534 access the memory sub-banks 536. Each of the RIMD computing nodes 534 are near at least one of the memory sub-banks 536 that can be accessed more quickly by the respective RIMD computing nodes 534. The RIMD computing nodes 534 may access other memory sub-banks 536 that are further away through the smart router and prefetcher units 538.

Distributing the RIMD computing nodes 534 among the memory sub-banks 536 may result in the RIMD computing nodes 534 having variable latencies. However, splitting the pipeline between a scalar pipeline (e.g., GPCU) and a vector pipeline (e.g., independent RIMD computing nodes) may result in a scalable and high performance system, notwithstanding the any additional expense of memory operations.

The smart router and prefetcher units 538 route and arbitrate memory access operations, and perform some memory prefetching, write buffering, and data merging. The smart router and prefetcher units 538 are programmable prefetchers, and work with each of the RIMD computing nodes 534 to reduce the latency associated with accessing far data nodes. The smart router and prefetcher units 538 prefetch data based on a stride or offset from a base memory address. In some embodiments, the smart router and prefetcher units 538 merge write operations from several compute nodes, which may reduce the total quantity of access to memory. In some embodiments, the DMA controller 522 is a helper module that allows the RIMD computing nodes 534 to perform DMA through the smart router and prefetcher units 538. The smart router and prefetcher units 538 may be referred to as smart arbiter and prefetchers (SAPs).

Figure 6:
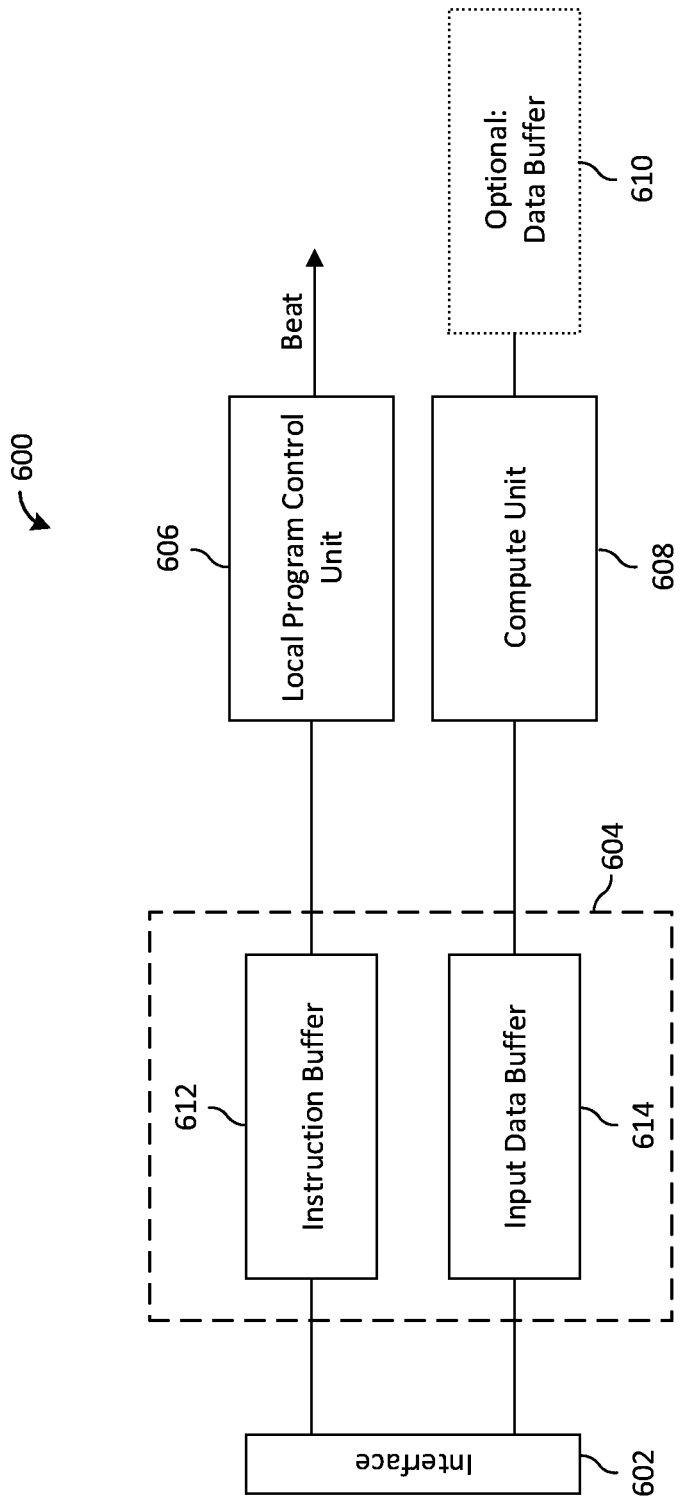
FIG. 6 is a block diagram of a RIMD computing node.

FIG. 6 is a block diagram of a RIMD computing node 600. The RIMD computing node 600 includes a RIMD interface 602, a queue 604, a local program control unit (LPCU) 606, a compute unit 608, and an optional data buffer 610. The RIMD interface 602 interfaces the RIMD computing node 600 with other devices in a processor, e.g., the instruction routers 532.

The queue 604 receives instructions and data from the instruction routers 532 and buffers them. Buffering instructions and input data allows the RIMD computing node 600 to operate independently of other RIMD computing nodes in a RIMD processor. The queue 604 localizes any stalls in the RIMD computing node 600, so that other RIMD computing nodes are not affected. The queue 604 includes an instruction buffer 612 (or "instruction queue") and an input data buffer 614 (or "result queue"). The instruction buffer 612 buffers instructions, and the input data buffer 614 buffers data that is needed to execute the instructions.

The LPCU 606 includes instruction decoding and dispatching functionality. The LPCU 606 includes logic to send a beat to the GPCU 512 each time the RIMD computing node 600 completes an instruction in the instruction buffer 612.

The compute unit 608 includes function units that perform the main computations in the RIMD computing node 600. For example, the compute unit 608 includes a multiplexing unit, registers, and load/store units. In some embodiments, the compute unit 608 has a dedicated load/store path for the load/store units, so that the compute unit 608 may access memory independently of other RIMD computing units.

Some embodiments include the data buffer 610. The data buffer 610 may be similar to the input data buffer 614, and may be in the load/store path, to buffer memory access operations. Use of the data buffer 610 may prevent the RIMD computing node 600 from stalling when it attempts to access memory that another RIMD computing node is accessing. Variable memory latencies may cause back-to-back read operations to return data to the compute unit 608 out of order. Buffering read data temporarily allows the memory to be read by the compute unit 608 in order. The data buffer 610 may be, e.g., a content-addressable memory (CAM) cache, a first-in-first-out (FIFO) buffer, or the like. In some embodiments, the data buffer 610 may be small, such as less than about 1 kilobyte (KB) in size. The size of the data buffer 610 may be determined according to the latency to memory banks. In some embodiments, the furthest latency to the memory bank may be used to determine the size of the data buffer 610. In some embodiments, the data buffer 610 may be less than or equal to about double the size of the instruction buffer 612. The data buffer 610 also buffer write operations.

Figure 7:
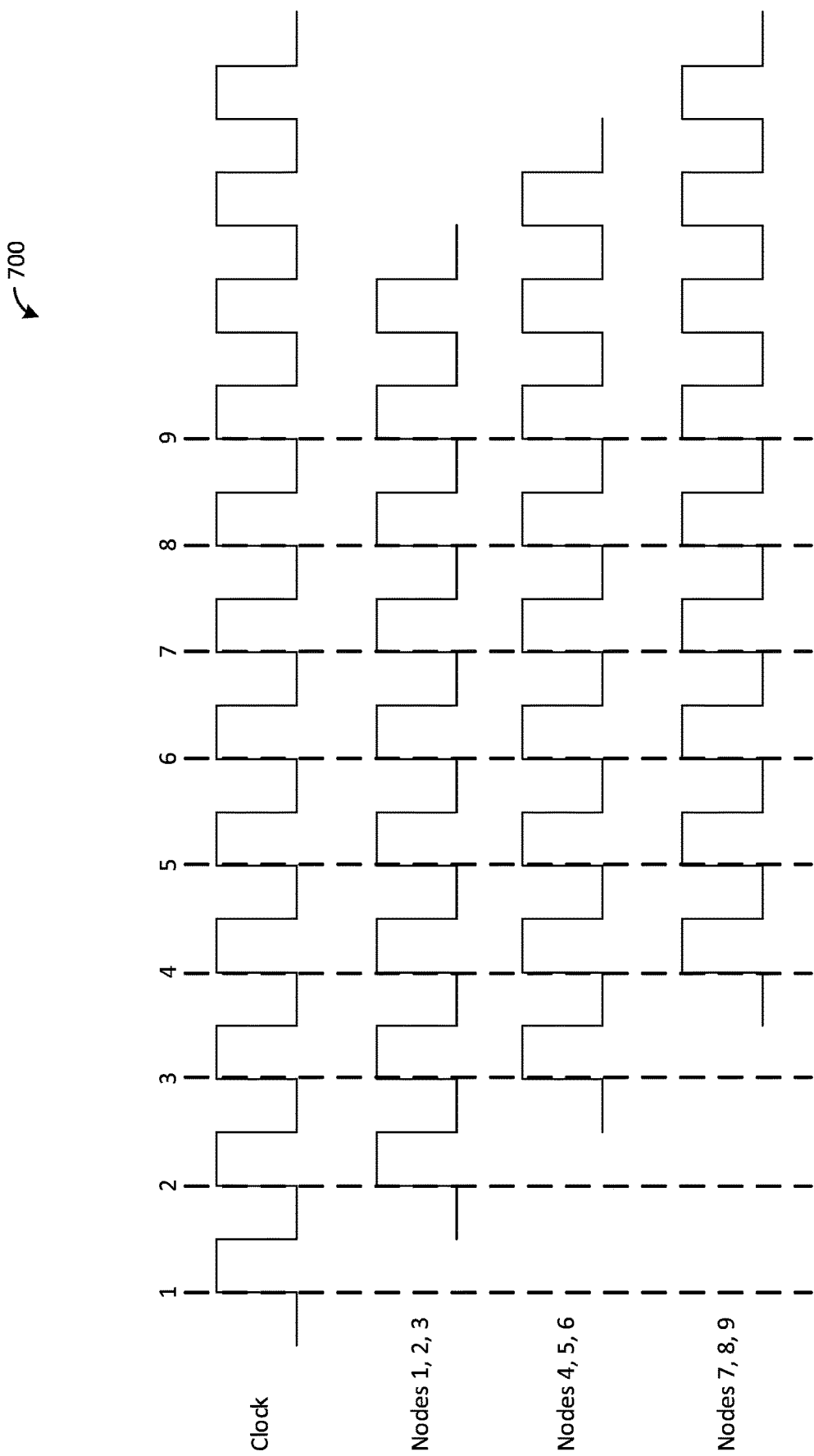
FIG. 7 is a timing diagram for RIMD instruction execution.

FIG. 7 is a timing diagram 700 for RIMD instruction execution. The timing diagram 700 shows timing states of the system clock and nine computing nodes. The timing diagram 700 illustrates how RIMD computing nodes may execute instructions independently. In the timing diagram 700, a program is dispatched by the GPCU at cycle 1. Computing nodes 1, 2, and 3 receive the program and begin executing it at cycle 2. Computing nodes 4, 5, and 6 receive the program and begin executing it at cycle 3. Computing nodes 7, 8, and 9 receive the program and begin executing it at cycle 4. The program reaches different computing nodes at different times based on, e.g., where the computing nodes are physically located in the processor. Further nodes may have higher latencies. Other factors may also affect when the computing nodes receive the program and begin executing it.

The quantity of RIMD computing nodes selected for a task is dynamically configurable, and may be based on, e.g., task requirements. In the timing diagram 700, nine threads are configured to run the program. This quantity may change for different tasks. Additionally, the RIMD computing nodes may be further divided into parallel threads. The number of parallel threads allocated from a RIMD cluster is also configurable, e.g., a maximum limit may be put on the quantity of allocated threads. For example, continuing the example shown in the timing diagram 700, the RIMD cluster could have been divided in several manners: (1) all of the RIMD computing nodes may be running same thread; (2) all of the RIMD computing nodes may be running different threads; (3) some units may be running a first thread, and other units may be running a second thread; and (4) some units may be running a first and second thread, and others may be powered down. Other configurations may also be possible.

Figure 8:
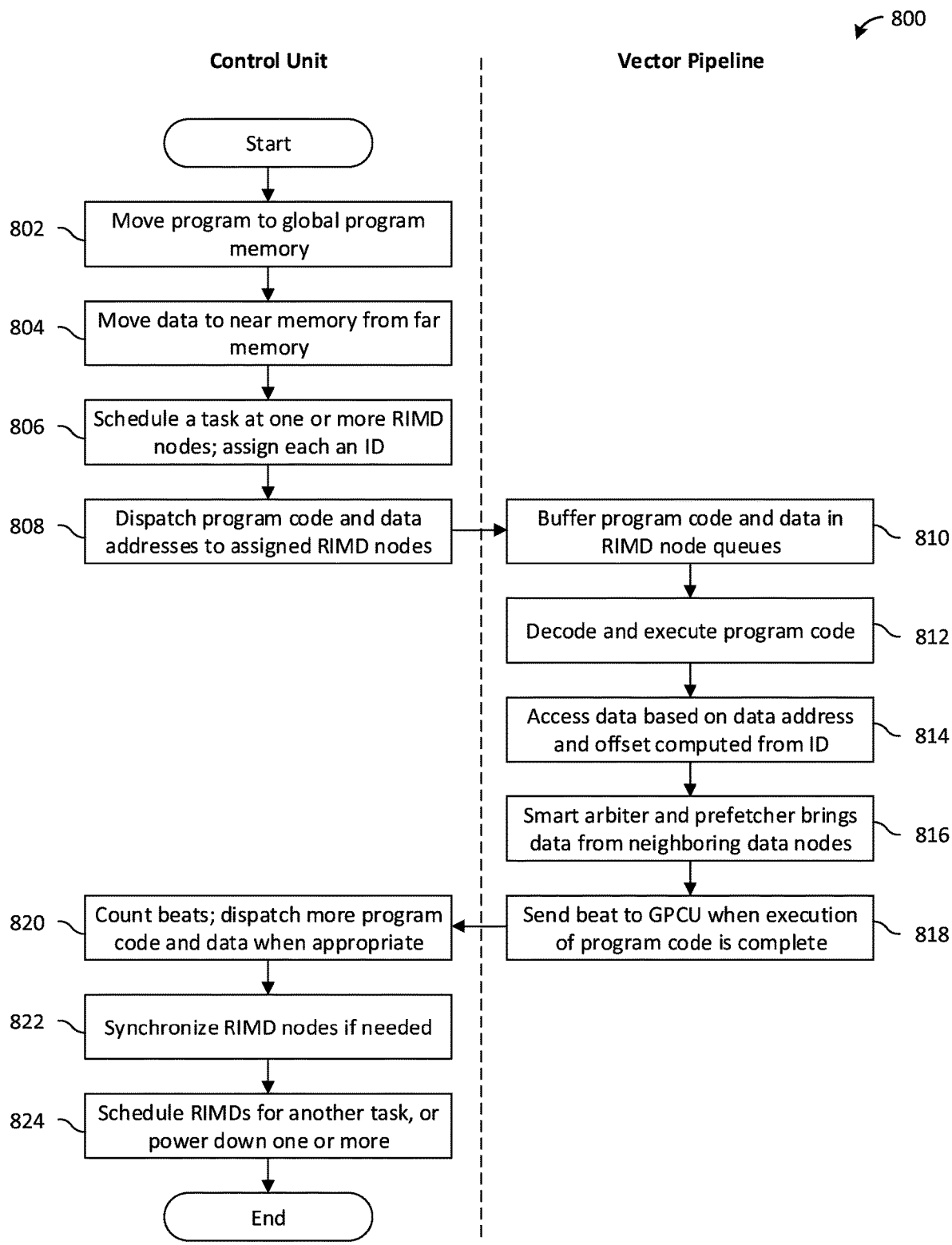
FIG. 8 is a flow diagram for a RIMD processing method.

FIG. 8 is a flow diagram for a RIMD processing method 800. It should be appreciated that the RIMD processing method 800 does not show a sequence of steps. Rather, blocks in the RIMD processing method 800 could be operating in parallel.

First, a program for execution is moved to global program memory by the GPCU (step 802). The program may be in far memory, or may be fetched from a program cache or memory for programming. In embodiments where the program is in memory, it may be fetched through DMA. Next, data needed for execution of the program is moved from far memory (step 804). In some embodiments, moving may be accomplished by copying the data with DMA. The scheduler schedules a task at one or more RIMD computing nodes (step 806). The scheduler selects the quantity of computing nodes for the task, and assigns an identifier (ID) to each node. The GPCU fetches program code for the task, and dispatches it to the scheduled RIMD computing nodes with a data address for the task (step 808). The program code is then pushed to each RIMD computing node. Because the RIMD computing nodes are in distributed shared memory, programming may not need to be copied to the nodes using expensive operations such caching or DMA.

Each RIMD computing node receives and buffers the program code and data address (step 810). The RIMD computing nodes decode and execute the program code dispatched to them (step 812). The RIMD computing nodes access data during execution using the received data address, at an offset from the data address that is computed using the ID assigned to each computing node (step 814). Accessed data may be brought nearer to the RIMD computing node with a SAP (step 816). The SAP may prefetch data by communicating with other SAPs in the memory. Each RIMD computing node sends a beat to the GPCU when it is finished executing or dispatching an instruction (step 818).

The GPCU keeps track of the progress of each RIMD computing node by counting the quantity of beats each sends (step 820). The GPCU dispatches more program code and data address to the RIMD computing nodes as they complete instructions in their buffers. The GPCU may also use the beats from the RIMD computing nodes to synchronize the nodes, if needed (step 822). When the task is complete, the GPCU may schedule the RIMD computing nodes for another task by repeating steps 802-822, or may power down the nodes if there are no more tasks (step 824).

Figure 9:
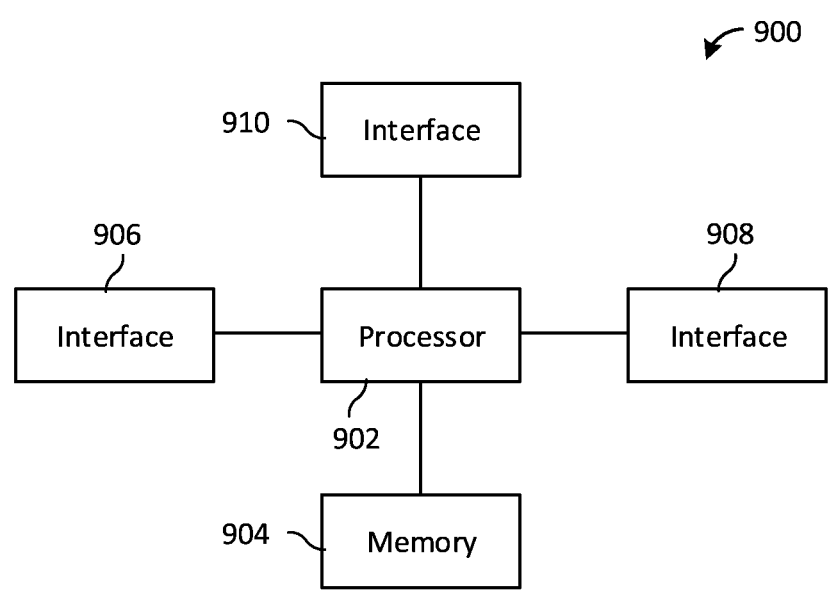
FIG. 9 is a block diagram of a processing system.

FIG. 9 is a block diagram of a processing system 900 for performing methods described herein, which may be installed in a host device. As shown, the processing system 900 includes a processor 902, a memory 904, and interfaces 906-910, which may (or may not) be arranged as shown in FIG. 9. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 91o may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 91o may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processing system, comprising:
a plurality of computing nodes forming a plurality of vector instruction pipelines, the plurality of vector instruction pipelines comprising parallel processing lanes for execution of a task comprising instructions; and
a global program controller unit (GPCU) coupled to and controlling the plurality of computing nodes during execution of the task, the GPCU:
receiving beat signals from each computing node, each beat signal including a beat, and adding the received beats to counters of a plurality of counters that each correspond to the plurality of computing nodes, each computing node generating a beat signal upon completion of an instruction, and the GPCU maintaining a beat count for the each computing node;
comparing the plurality of counters;
determining a fastest computing node and a slowest computing node; and
moderating one or both of an instruction flow or a data flow to the fastest computing node when a fastest computing node beat count exceeds a difference threshold from the slowest computing node beat count, the GPCU operating individual computing nodes asynchronously while maintaining beat counts of all computing nodes within a beat difference range.

2. The processing system of claim 1, wherein the GPCU stalls provision of a next instruction to one or more fastest computing nodes.

3. The processing system of claim 1, wherein the GPCU stalls provision of a next data to one or more fastest computing nodes.

4. The processing system of claim 1, wherein the GPCU stalls provision of next instructions to all computing nodes of the plurality of computing nodes until a beat signal is received for a currently processed instruction being processed by the particular computing node.

5. The processing system of claim 1, wherein the GPCU stalls provision of a next data portion to a particular computing node until a beat signal is received for a currently processed instruction being processed by the particular computing node.

6. The processing system of claim 1, wherein the GPCU stalls provision of a next data portion to a particular computing node and to one or more other computing nodes until a beat signal is received for a currently processed instruction being processed by the particular computing node.

7. The processing system of claim 1, wherein the GPCU stalls provision of next data portions to all computing nodes of the plurality of computing nodes until a beat signal is received for a currently processed instruction being processed by the particular computing node.

8. The processing system of claim 1, wherein the each computing node includes an instruction buffer coupled to the each computing node, the instruction buffer receiving an instruction from the GPCU.

9. The processing system of claim 1, wherein the each computing node includes a data buffer coupled to the each computing node, the data buffer receiving data from a memory.

10. The processing system of claim 1, wherein the moderating is performed due to a memory access conflict at the slowest computing node.

11. The processing system of claim 1, wherein the GPCU receives a beat signal from a particular computing node when the particular computing node finishes executing an instruction or when the particular computing node finishes dispatching an instruction.

12. A processing method in a global program controller unit (GPCU) coupled to and controlling a plurality of computing nodes during execution of a task comprising instructions, the plurality of computing nodes forming a plurality of vector instruction pipelines, the plurality of vector instruction pipelines comprising parallel processing lanes for execution of the task, the method comprising:
the GPCU receiving beat signals from each computing node, each beat signal including a beat, and adding the received beats to counters of a plurality of counters that each correspond to the plurality of computing nodes, each computing node generating a beat signal upon completion of an instruction, and the GPCU maintaining a beat count for the each computing node;
the GPCU comparing the plurality of counters;
the GPCU determining a fastest computing node and a slowest computing node; and
the GPCU moderating one or both of an instruction flow or a data flow to the fastest computing node when a fastest computing node beat count exceeds a difference threshold from the slowest computing node beat count, the GPCU operating individual computing nodes asynchronously while maintaining beat counts of all computing nodes within a beat difference range.

13. The method of claim 12, wherein the GPCU stalls provision of a next instruction to one or more fastest computing nodes.

14. The method of claim 12, wherein the GPCU stalls provision of a next data to one or more fastest computing nodes.

15. The method of claim 12, wherein the GPCU stalls provision of next instructions to all computing nodes of the plurality of computing nodes until a beat signal is received for a currently processed instruction being processed by the particular computing node.

16. The method of claim 12, wherein the GPCU stalls provision of a next data portion to a particular computing node until a beat signal is received for a currently processed instruction being processed by the particular computing node.

17. The method of claim 12, wherein the GPCU stalls provision of a next data portion to a particular computing node and to one or more other computing nodes until a beat signal is received for a currently processed instruction being processed by the particular computing node.

18. The method of claim 12, wherein the GPCU stalls provision of next data portions to all computing nodes of the plurality of computing nodes until a beat signal is received for a currently processed instruction being processed by the particular computing node.

19. The method of claim 12, wherein the each computing node includes an instruction buffer coupled to the each computing node, the instruction buffer receiving an instruction from the GPCU.

20. The method of claim 12, wherein the each computing node includes a data buffer coupled to the each computing node, the data buffer receiving data from a memory.

21. The method of claim 12, wherein the moderating is performed due to a memory access conflict at the slowest computing node.

22. The method of claim 12, wherein the GPCU receives a beat signal from a particular computing node when the particular computing node finishes executing an instruction or when the particular computing node finishes dispatching an instruction.

* * * * *